(12) United States Patent
Yamamoto et al.

(10) Patent No.: US 7,094,106 B2
(45) Date of Patent: Aug. 22, 2006

(54) ADAPTOR FOR MEMORY CARD

(75) Inventors: Toshihiro Yamamoto, Tsu (JP); Hirohisa Tanaka, Tsu (JP)

(73) Assignee: Matsushita Electric Works, Ltd., (JP)

( * ) Notice: Subject to any disclaimer, the term of this patent is extended or adjusted under 35 U.S.C. 154(b) by 0 days.

(21) Appl. No.: 10/531,457

(22) PCT Filed: Mar. 9, 2004

(86) PCT No.: PCT/JP2004/003028

§ 371 (c)(1),
(2), (4) Date: Apr. 14, 2005

(87) PCT Pub. No.: WO2004/081858

PCT Pub. Date: Sep. 23, 2004

(65) Prior Publication Data

US 2006/0014434 A1     Jan. 19, 2006

(30) Foreign Application Priority Data

Mar. 10, 2003   (JP) ............................. 2003-064059
Mar. 18, 2003   (JP) ............................. 2003-074510

(51) Int. Cl.
*H01R 24/00* (2006.01)
(52) U.S. Cl. ........................ 439/630; 439/159
(58) Field of Classification Search ............... 439/630, 439/267, 76.1, 140, 141, 64, 372, 152–160, 439/541.5, 67, 68, 135
See application file for complete search history.

(56) References Cited

U.S. PATENT DOCUMENTS 5,421,737 A * 6/1995 Chen et al. ................. 439/157
5,846,092 A   12/1998 Feldman et al.
6,224,391 B1   5/2001 Horie et al.
6,413,108 B1 * 7/2002 Centofante ................. 439/267
6,634,905 B1 * 10/2003 Kuo ......................... 439/541.5
6,641,441 B1 * 11/2003 Liu ........................... 439/630
6,695,637 B1 * 2/2004 Liu ........................... 439/377

FOREIGN PATENT DOCUMENTS

| JP | 10-083434 A1 | 3/1998 |
| JP | 10-240887 A | 9/1998 |
| JP | 11-003405 A1 | 1/1999 |
| JP | 2001-076101 | 3/2001 |

(Continued)

OTHER PUBLICATIONS

PCT International Search Report for PCT/JP2004/003028 mailed on Jun. 22, 2004.

(Continued)

*Primary Examiner*—Truc T. Nguyen
*Assistant Examiner*—Edwin A. Leon
(74) *Attorney, Agent, or Firm*—Rader, Fishman & Grauer PLLC

(57) ABSTRACT

An adaptor for using a mini-sized memory card in an appliance having a slot for a regular-sized memory card is provided. This adaptor is formed with a base and a cover made of a resin material, a plurality of electrically conductive members fixed to the base so as to electrically contact a plurality of I/O terminals of the memory card in the adapter, and a metal shell held between the base and the cover. A memory-card storage room is provided by a space surrounded by the metal shell and the base. By use of the metal shell, it is possible to improve rigidity of the adaptor, obtain a reliable compatibility, and prevent that the thin, mini-sized memory card is damaged.

8 Claims, 15 Drawing Sheets

FOREIGN PATENT DOCUMENTS

| | | |
|---|---|---|
| JP | 2001-512874 A1 | 8/2001 |
| JP | 2003-067678 | 3/2003 |
| TW | 464110 A | 11/2001 |
| TW | 502219 A | 9/2002 |

OTHER PUBLICATIONS

Taiwanese Office Action dated Aug. 15, 2005.
Examination Report for JP 2003-074510 dated Feb. 28, 2006.
Examination Report for JP 2003-064059 dated Feb. 28, 2006.

* cited by examiner

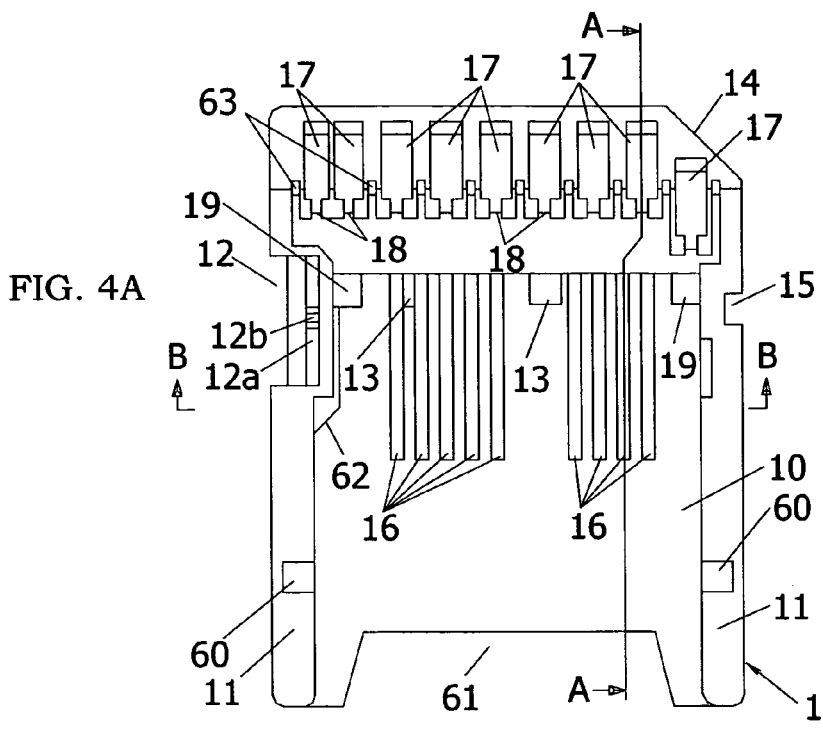
FIG. 4A
FIG. 4B
FIG. 4C
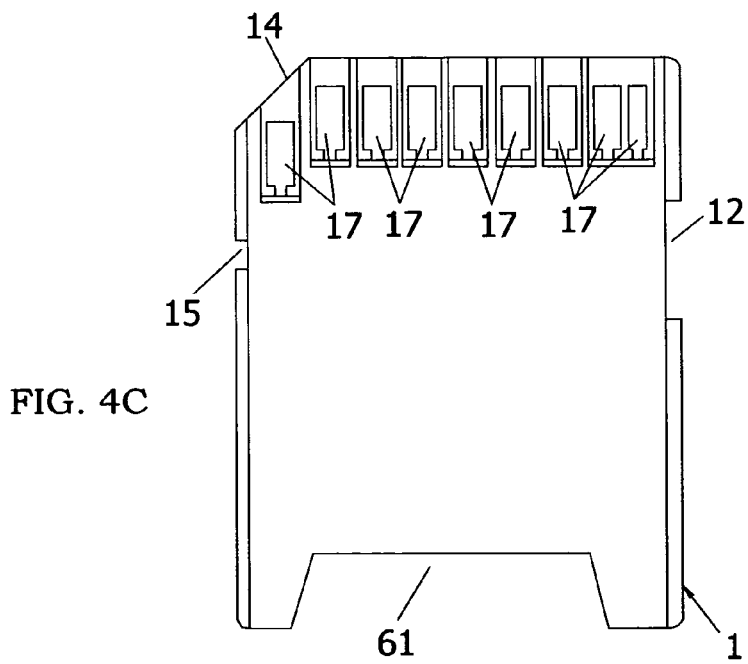
FIG. 4D
FIG. 4E
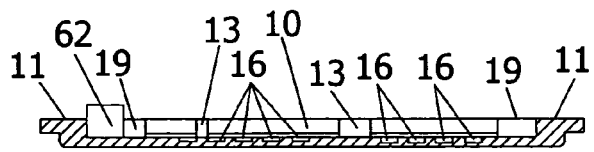

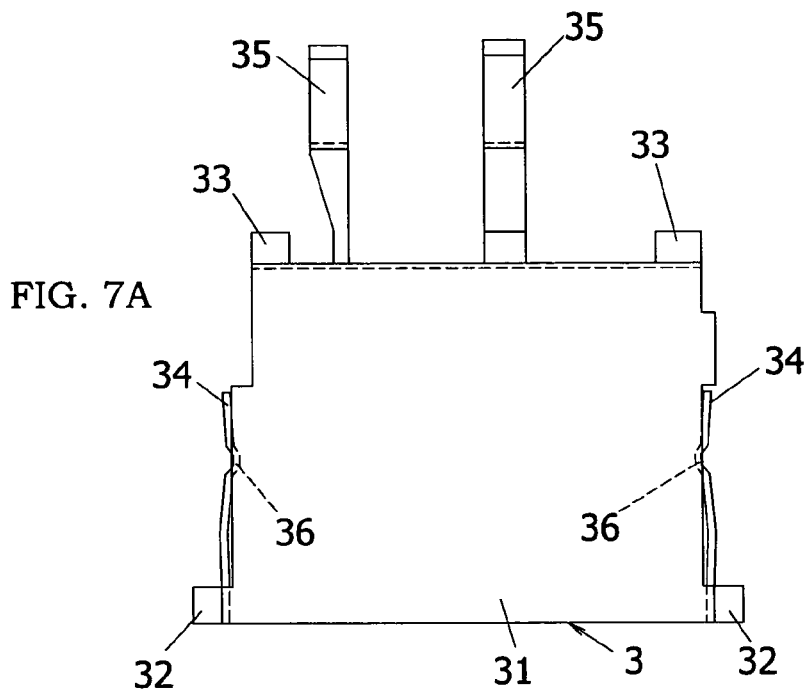
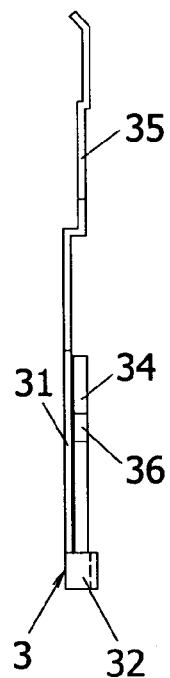
FIG. 7A
FIG. 7B
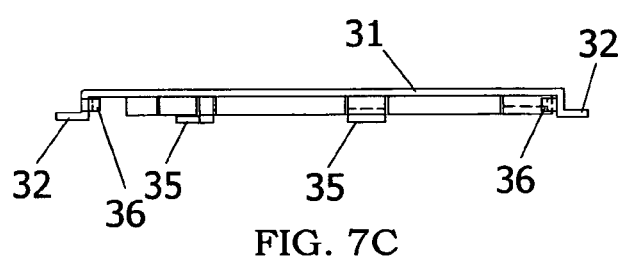
FIG. 7C
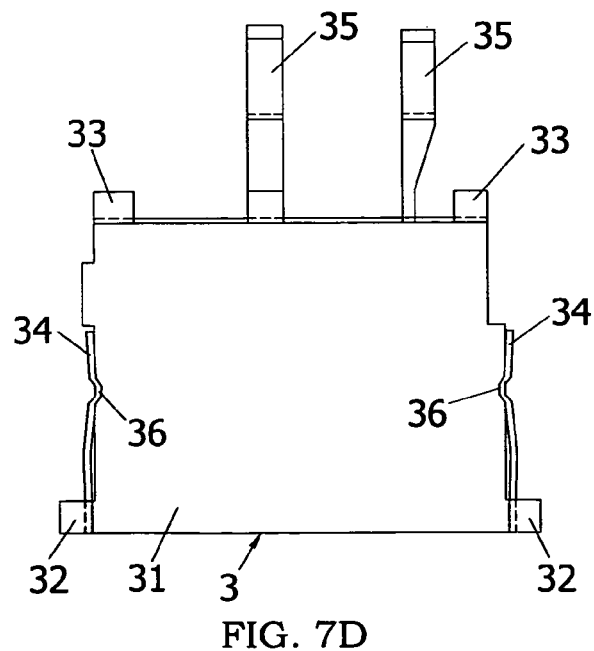
FIG. 7D

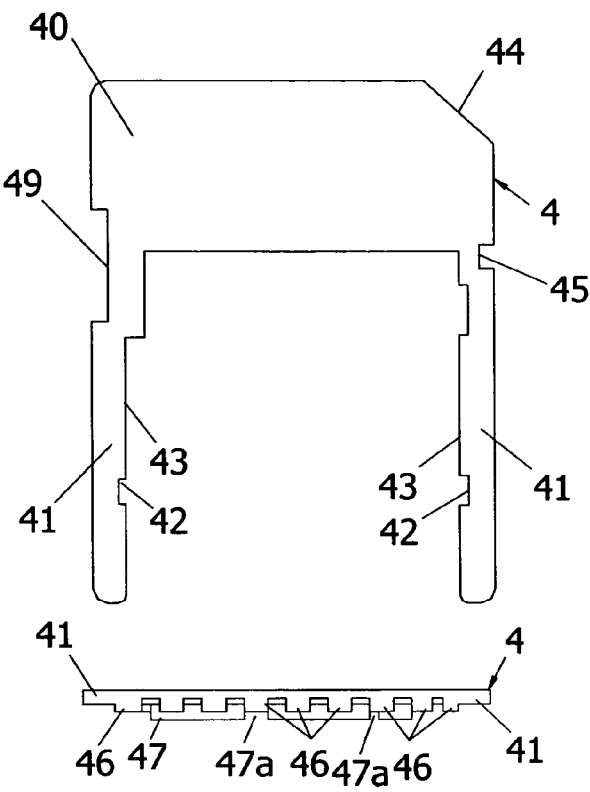
FIG. 8A
FIG. 8B
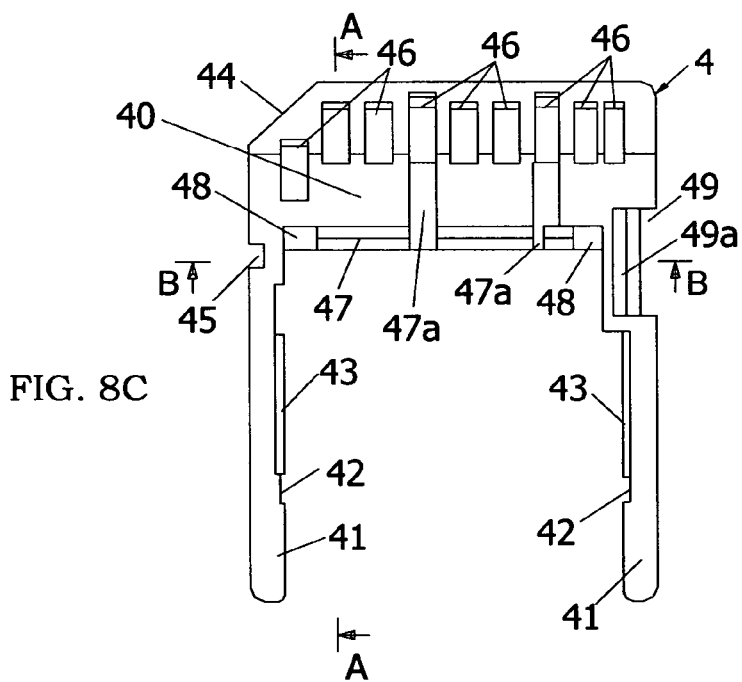
FIG. 8C
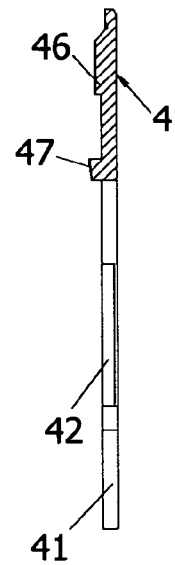
FIG. 8D
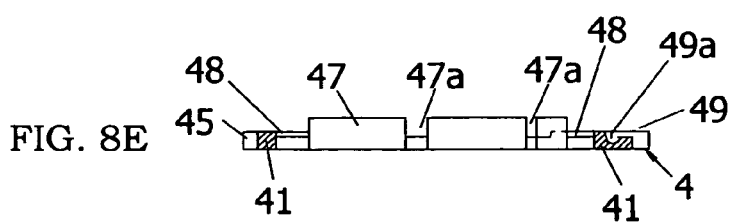
FIG. 8E

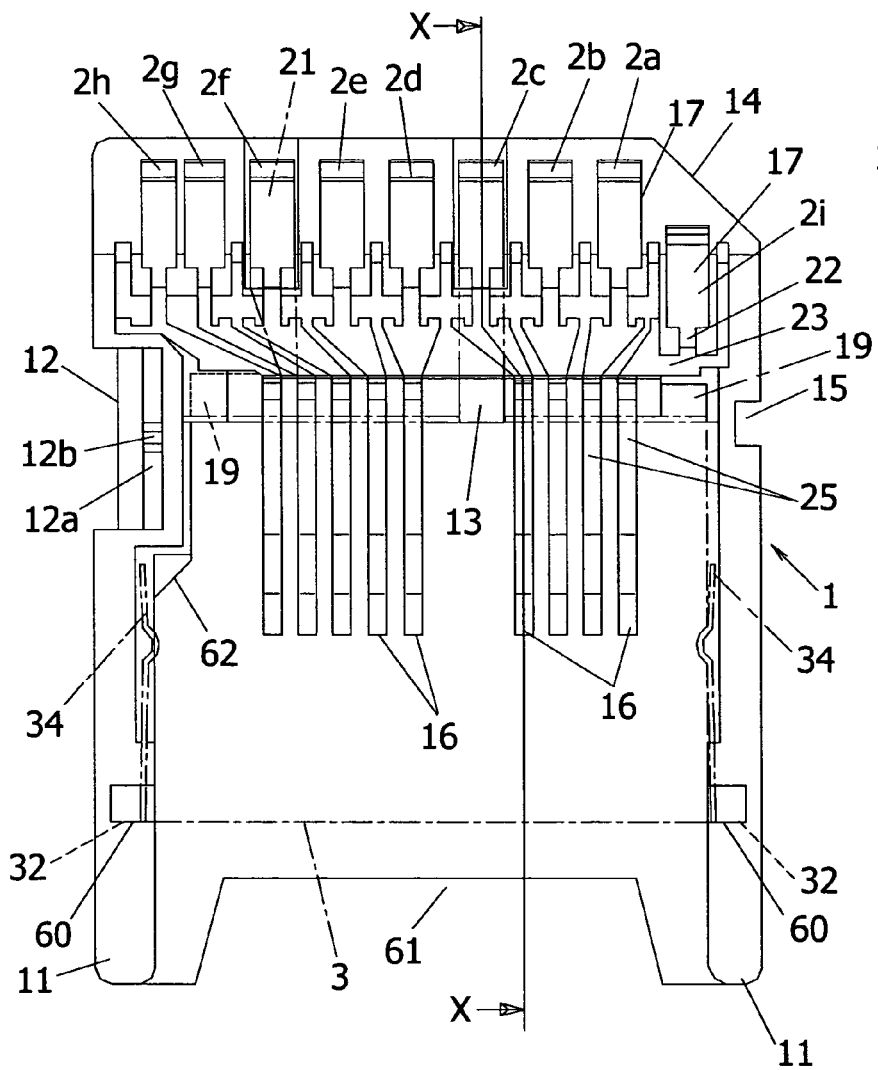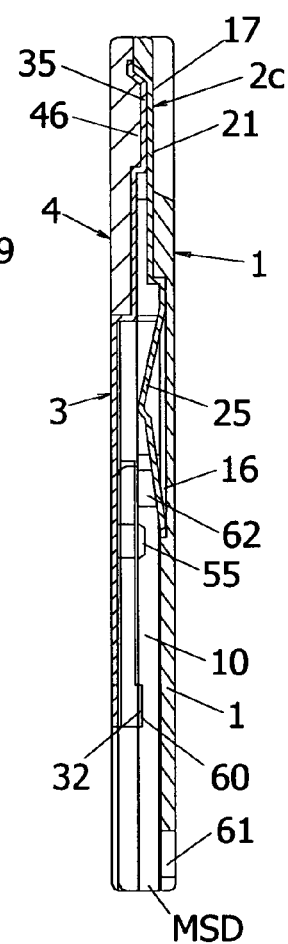
FIG. 11A
FIG. 11B

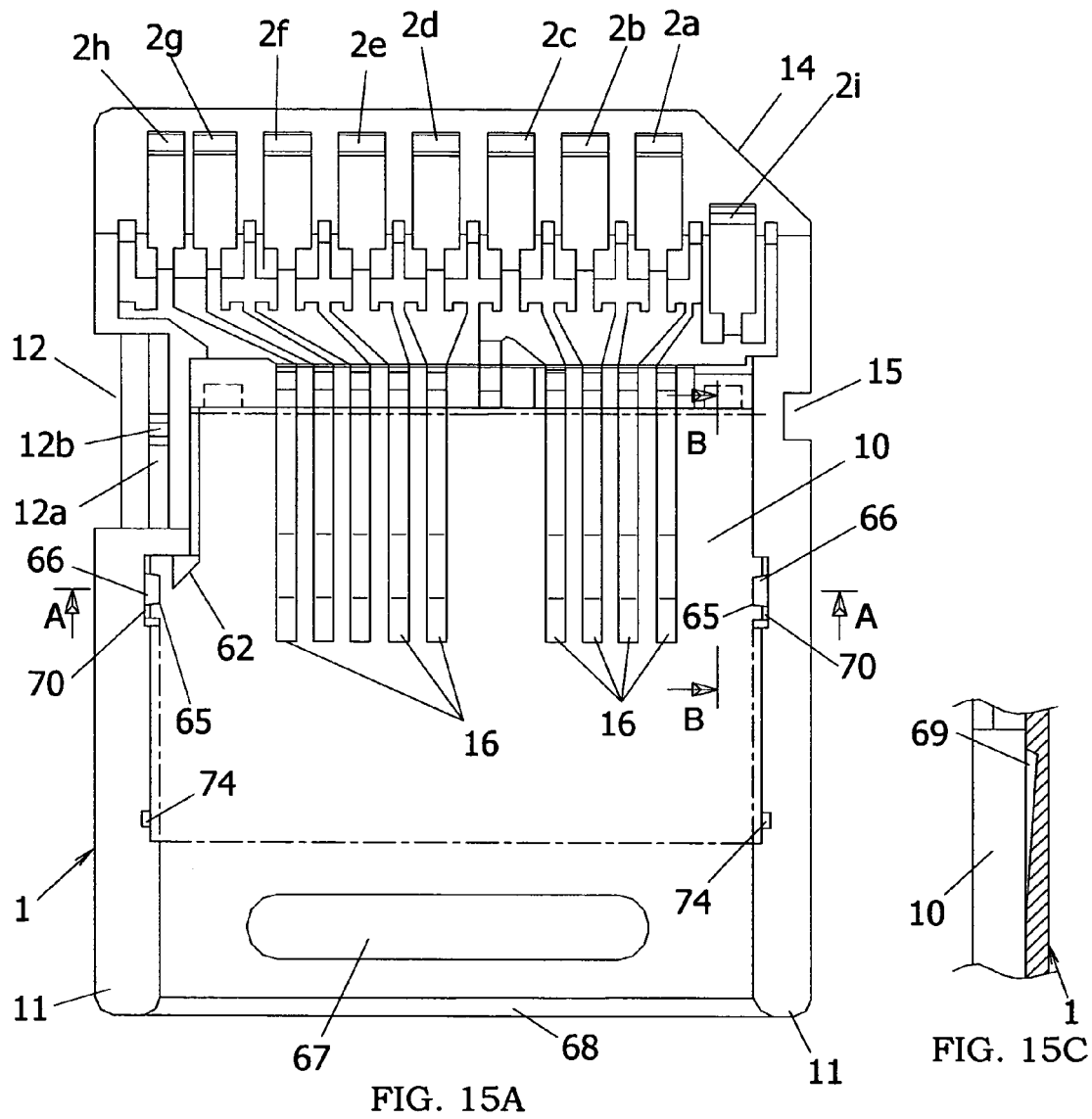
FIG. 15A
FIG. 15C
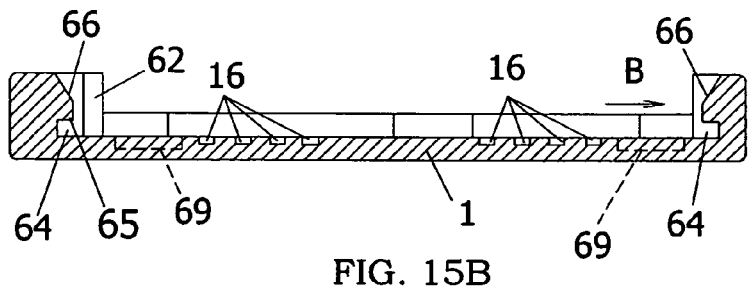
FIG. 15B
FIG. 15D

US 7,094,106 B2

ADAPTOR FOR MEMORY CARD

TECHNICAL FIELD

The present invention relates to an adaptor for a memory card, which enables a mini-sized memory card to be used in an electronic appliance having a slot for a regular-sized memory card.

BACKGROUND ART

Memory cards such as SD memory card and multi media card (MMC) are becoming increasingly common in digital cameras, laptop computers and mobile phones, which place importance on portability and power consumption. In addition, as these electronic appliances are further downsized, a thinner compact mini memory card such as mini SD memory card is proceeding toward commercialization. To use such a mini memory card in an electronic appliance having a slot for a conventional regular-sized memory card, an adaptor is needed, which can accommodate the mini memory card therein, and be electrically and mechanically connected to the slot for the regular-sized memory card.

For example, Japanese Patent Early Publication [kokai] No. 11-3405 discloses an adaptor used to connect a memory card to a slot for another standard memory card. This adaptor is mainly composed of a frame with a pair of arms and a coupling piece, circuit board having a conductive pattern, and a pair of upper and lower metal covers. The frame is a synthetic resin product manufactured by injection molding. The circuit board is formed by printing a wiring pattern on an insulating material such as a phenol resin. One end of the conductive pattern is electrically connected to a plurality of terminals of the memory card inserted in the adaptor, and the opposite end of the conductive pattern is electrically connected to a plurality of terminals of the electronic appliance when the adaptor is inserted in the memory card slot. The frame mounting the circuit board thereon is held between the metal covers.

In this adaptor, the memory card is supported by the pair of arms of the frame made of a resin material. Although the arms are reinforced by the upper and lower metal covers, warpage or deformation of the arms of the resin material easily occurs. For example, when it is used as an adaptor for a thin mini memory card, the mini memory card may be damaged. In addition, since surfaces other than both side limbs of the memory card inserted in the adaptor are exposed, there is a fear that the exposed surfaces are grasped by mistake to eject the adaptor from the slot of the electronic appliance. In such a case, the thin mini memory card may be damaged. Thus, the conventional adaptor structure is not sufficiently considered as the adaptor for the thin compact mini memory card in view of its rigidity, and therefore has still plenty of room for improvement.

SUMMARY OF THE INVENTION

In consideration of the above problems, a primary concern of the present invention is to provide an adaptor for a memory card, which has the capability of effectively preventing the occurrence of a damage of a mini-sized memory card, and providing a compatibility with an electronic appliance having a slot for a different sized memory card with a high degree of reliability.

That is, the adaptor of the present invention is an adaptor for a memory card having an insertion opening at its one end, through which the memory card is housed in the adaptor, and configured to be connectable to a memory card slot of an electronic appliance. The adaptor is characterized by comprising a base made of a resin material; a plurality of electrically conductive members fixed to a surface of the base so as to electrically contact a plurality of terminals of the memory card inserted in the adapter; a cover made of a resin material; and a metal shell held between the base and the cover, so that a memory-card storage room is provided by a space surrounded by the metal shell and the surface of the base.

As a preferred embodiment of the adaptor of the present invention, the electrically conductive members has first terminal portions at their one end, which electrically contact terminals of the electronic appliance when the adaptor is inserted in said memory card slot, and second terminal portions at their opposite end, which electrically contact terminals of the memory card when the memory card is housed in the adaptor, the second terminal portions are exposed in the memory-card storage room between the base and the metal shell, and the first terminal portions are accommodated between the base and the cover.

According to the present invention, the rigidity of the adaptor is improved by forming the memory-card storage room between the metal shell and the cover, so that both of the prevention of damage to the memory card and reliable compatibility with the electronic appliance having the slot for the different sized memory card can be achieved.

To prevent failing of the memory card from the adaptor in addition to the improvement of the rigidity, it is preferred that the metal shell is supported by the base to be movable in a seesaw fashion between an opening position where an insertion of the memory card in the memory-card storage room is enabled and a closing position where an ejection of the memory card from the memory-card storage room is disabled. In this case, the formation of a projection on the base at the vicinity of the insertion opening is further effective to prevent the falling of the memory card from the adaptor. Moreover, it is preferred that a pair of spring elements are integrally formed with the metal shell, and the spring elements are engaged to concaves formed in both sides of the memory card when the memory card is inserted in the adaptor. Furthermore, it is preferred that a projection is integrally formed with the metal shell, and the metal shell is locked at the closing position by engaging the projection to a concave formed in the base.

To improve shielding performance of the adaptor in addition to the improvement of the rigidity, it is preferred that a terminal element is integrally formed with the metal shell, and the terminal element electrically contacts an electrically conductive member for grounding fixed to the base. In this case, the shielding performance of the adaptor can be improved by connecting the metal shell to a ground contact of the electronic appliance through the terminal element. In addition, since the metal shell is integrally formed with the terminal element, it is possible to reduce the number of parts of the adaptor. Moreover, when the metal shell is movably supported relative to the base, it is preferred that one of the metal shell and the electrically conductive member for grounding has an elastic piece, and the electrically conductive member for grounding contacts the metal shell at the closing position through the elastic piece.

To facilitate the insertion or ejection of the memory card in addition to the improvement of the rigidity, it is preferred that the base has a groove in a surface facing the memory-card storage room to increase a range of the seesaw motion of the metal shell. In this case, since an opening area of the memory-card insertion aperture is increased, the memory card can be easily inserted in or ejected from the adaptor. Furthermore, it is preferred that the base has a notch configured such that the memory card is pushed from the outside of the adaptor through the notch in a direction of facilitating an ejection of the memory card from the memory-card storage room. In this case, even when the adaptor has above-described means for preventing the falling of the memory card, it is possible to easily eject the memory card from the adaptor.

Additional features and advantages brought thereby of the present invention will be clearly understood from the best mode for carrying out the invention described below.

BRIEF EXPLANATION OF THE DRAWINGS

In FIGS. 4A to 4E, FIG. 4A is a top view of a base, FIG. 4B is an end view of the base, FIG. 4C is a bottom view of the base, FIG. 4D is a cross-sectional view taken along the line A—A of FIG. 4A, and FIG. 4E is a cross-sectional view taken along the line B—B of FIG. 4A;

FIGS. 7A to 7D are respectively top, side, end and bottom views of a metal shell;

In FIGS. 8A to 8E, FIG. 8A is a top view of a cover, FIG. 8B is an end view of the cover, FIG. 8C is a bottom view of the cover, FIG. 8D is a cross-sectional view taken along the line A—A of FIG. 8C, and FIG. 8E is a cross-sectional view taken along the line B—B of FIG. 8C;

FIG. 11A is a plan view of the base with the electrically conductive members, and FIG. 11B is a cross-sectional view taken along the line X—X of FIG. 11A;

In FIGS. 15A to 15D, FIG. 15A is a top view of the base mounting the electrically conductive members thereon, FIG. 15B is a cross-sectional view taken along the line A—A of FIG. 15A, FIG. 15C is a cross-sectional view taken along the line B—B of FIG. 15A, and FIG. 15D is a partially cross-sectional view of a shaft portion;

BEST MODE FOR CARRYING OUT THE INVENTION

First Embodiment

Figure 1:
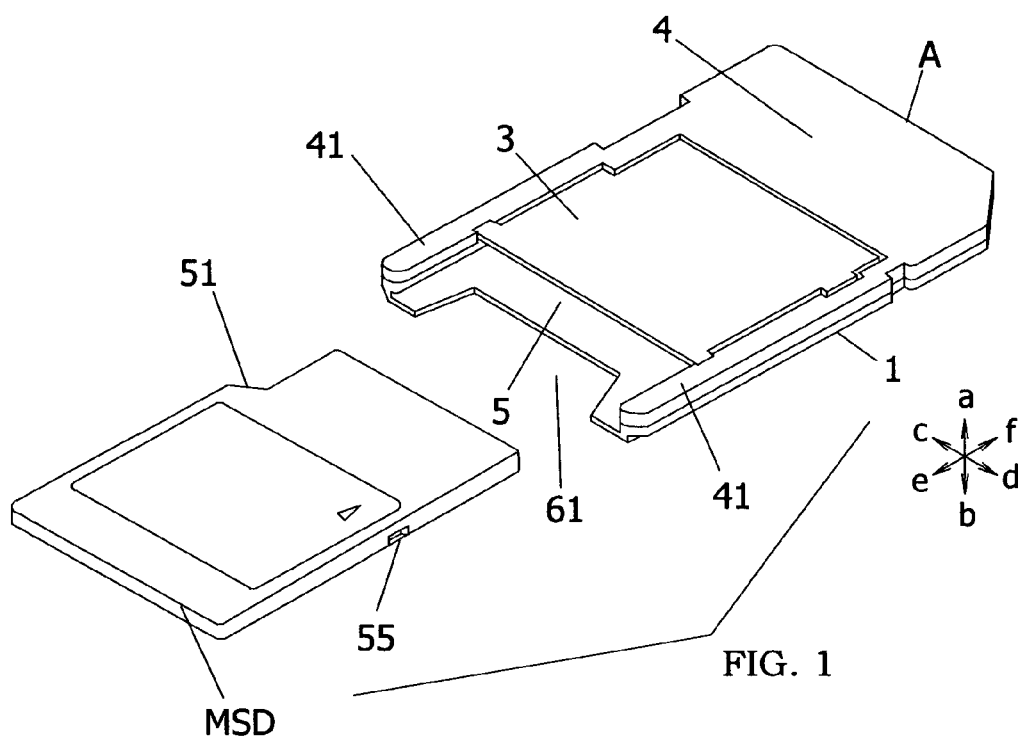
FIG. 1 is a perspective view of an adaptor for a memory card according to a first embodiment of the present invention.
Figure 2A:
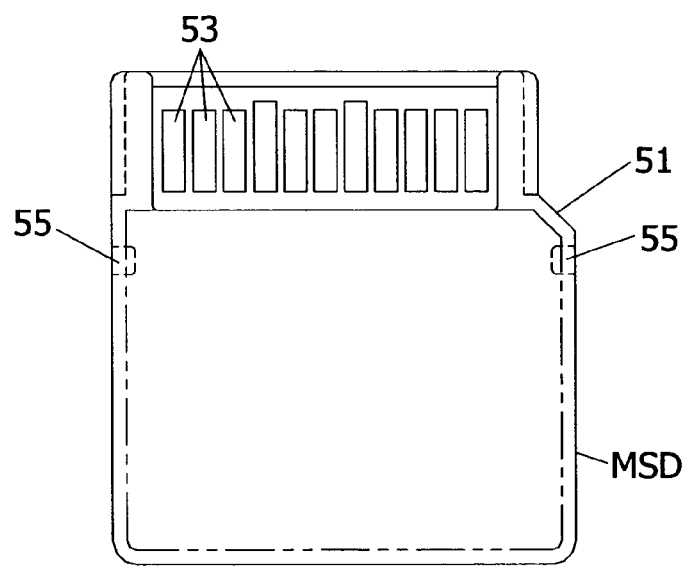
FIGS. 2A and 2B are plan and side views of a mini-sized memory card.
Figure 2B:
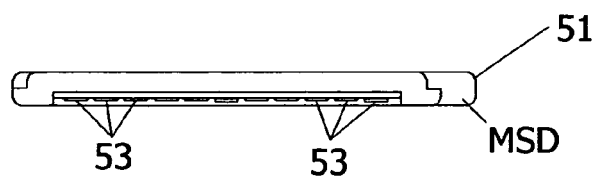
Figure 3:
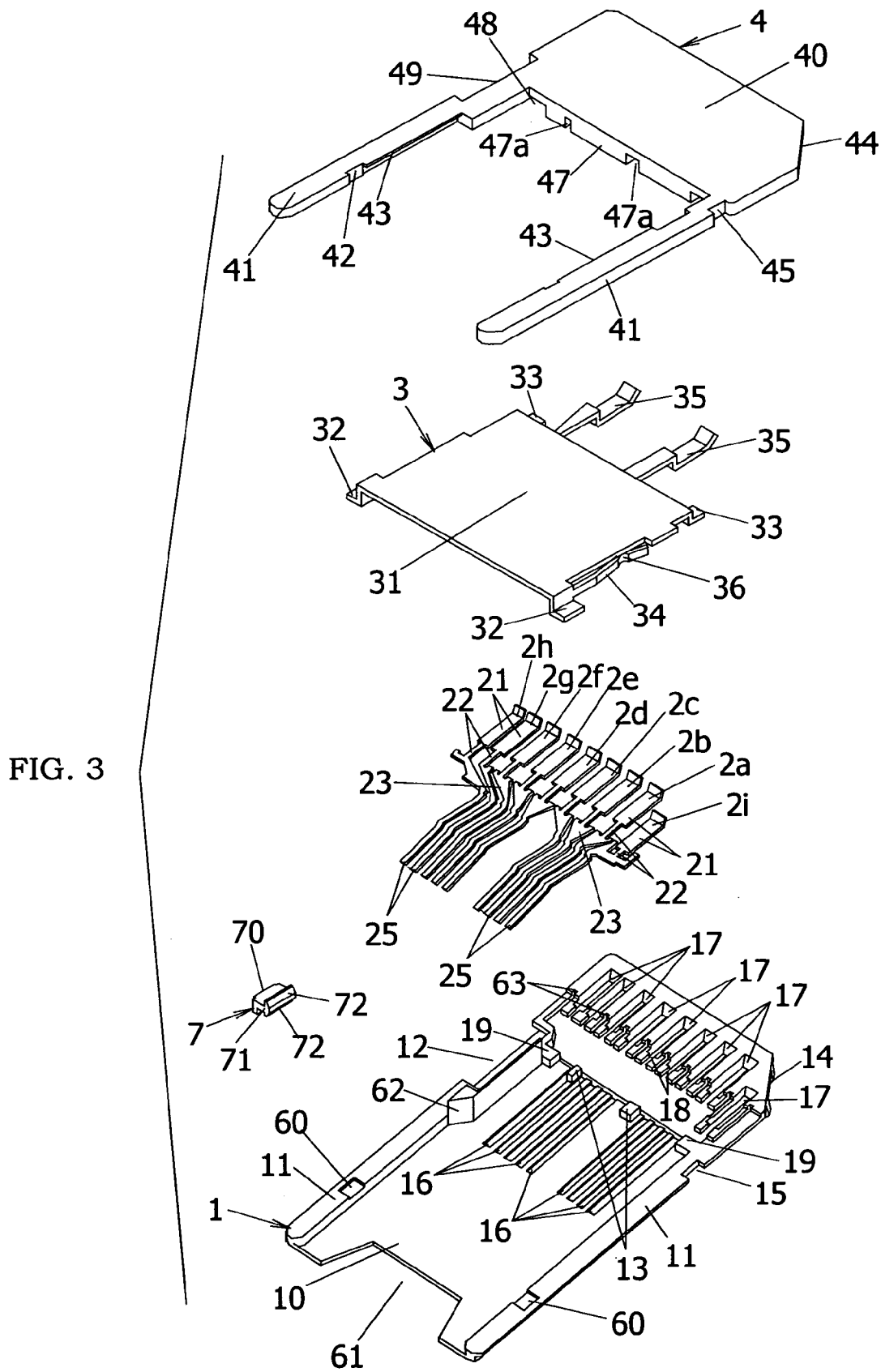
FIG. 3 is an exploded perspective view of the adaptor of the first embodiment.

As shown in FIGS. 1 to 3, an adaptor A for a memory card according to a preferred embodiment of the present invention is mainly composed of a base 1 made of a synthetic resin, electrically conductive members 2a to 2i fixed to a top surface of the base, metal shell 3, and a cover 4 made of a synthetic resin and having a pair of arms 41. A memory-card storage room is provided by a space surrounded by the metal shell 3 and the base 1.

This adaptor is used to connect a mini SD memory card "MSD" shown in FIGS. 2A and 2B to a slot for a regular-sized SD memory card of an electronic appliance such as digital cameras, laptop computers and mobile phones. The adaptor has an insertion opening 5 at its one end, through which the mini SD memory card can be inserted. This adaptor is formed such that the outline defined determined by the base 1, cover 2 and the metal shell 3 has the same dimensions in the lengthwise, lateral and thickness directions as the regular SD memory card. In the following explanation, unless otherwise specified, the directions shown by the arrows "a"–"b" in FIG. 1 designate up and down directions, the directions shown by the arrows "c"–"d" designate left and right directions, and the directions shown by the arrows "e"–"f" designate back and forth directions.

<Base>

The base 1 is explained, referring to FIGS. 3 and 4A to 4E. The base 1 is formed in a rectangular plate shape by use of an electrical insulating resin material. In a top surface of the base 1, a concave 10 is opened at its front end ("e" direction). The memory-card storage room is formed between the concave 10 and the metal shell 3.

In the drawings, the numeral 11 designates a pair of flanges extending at both sides of the concave 10 in the back and forth directions. The numeral 12 designates a knob accommodating recess for accommodating a write-protect knob 7 that is a synthetic-resin molded article. One of the flanges 11 extends in a roundabout manner so as to avoid the knob accommodating recess 12. The numeral 12a designates a groove extending in the knob accommodating recess 12 along the back and forth directions of the base 1. An engaging boss 12b is formed at a substantially intermediate position in the longitudinal direction of this groove. The numeral 13 designates a convex, which is allowed to abut against a ground terminal element 35 of the metal shell 3 described later.

The numeral 14 designates a chamfer portion formed at a corner of the base 1. By connecting this chamfer portion 14 with a chamfer portion 44 of the cover 4 described later, it is possible to prevent that the adaptor is inversely inserted in the memory card slot by mistake. The numeral 15 designates a notch formed in the base at a position corresponding to a notch 45 of the cover 4. A locking element provided in the electronic appliance can be engaged to these notches formed by connecting the base with the cover of the adaptor.

The numeral 16 designates a plurality of channels 9 formed in the bottom surface of the concave 10 to extend along the back and forth directions, i.e., the "e"–"f" directions (the inserting direction of the mini SD memory card "MSD"), which are spaced in substantially parallel from each other by a predetermined interval. The numeral 17 designates a plurality of through holes each having a substantially rectangular shape and extending in parallel at the rearward end of the base 1 to be spaced from each other by a predetermined interval. The arrangement of the through holes 17 corresponds to a terminal arrangement of the SD memory card. The numeral 18 designates narrow slots each communicated with the forward end of the through hole 17.

The numeral 19 designates protrusions, which are allowed to abut against projecting pieces 33 of the metal shell 3. The numeral 60 designates pockets formed in the respective flanges 11, into which stationary elements 32 of the metal shell are fitted. The numeral 61 designates an operation recess formed in the forward end of the base, which is configured in such a dimension that a user's finger can be put in the operation recess at the time of inserting or ejecting the mini SD memory card "MSD". The numeral 62 designates an inclined wall, which is allowed to abut against a shoulder portion 51 of the mini SD memory card at the time of inserting the memory card in the adaptor.

<Electrically Conductive Members>

The electrically conductive members 2a to 2i fixed in the concave 10 of the base 1 have first terminal portions at their one end, which electrically contact a plurality of terminals of the electronic appliance when the adaptor is inserted in the memory card slot, and second terminal portions at the opposite end, which electrically contact a plurality of I/O contact surfaces 53 of the memory card when the mini SD memory card is inserted in the adaptor.

In this embodiment, the number of the electrically conductive members is nine (2a to 2i), and each of the conductive members 2a to 2i is formed with a terminal element 21 having a rectangular sheet shape as the first terminal portion, stationary element 22 having a narrow width and extending from the forward end of the terminal element 21, center element 23 connected at one end to the stationary element 22, contact spring element 25 extending forward from the opposite end of the center element 23 as the second terminal portion. Each of the contact spring elements 25 is configured so as to be inclined upward from its opposite end portions toward a substantially intermediate portion, so that when the conductive members are attached to the base 1, the substantially intermediate portions of the contact spring elements project relative to the opposite end portions on the base (FIG. 11B explained later is referred to here).

Figure 5:
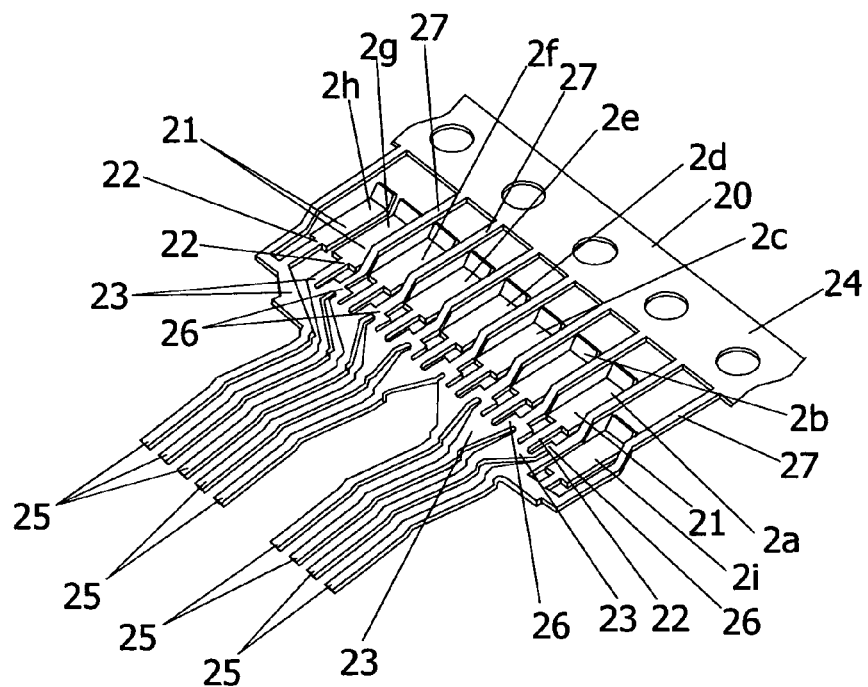
FIG. 5 is a perspective view of electrically conductive members before being separated from a hoop material.
Figure 6:
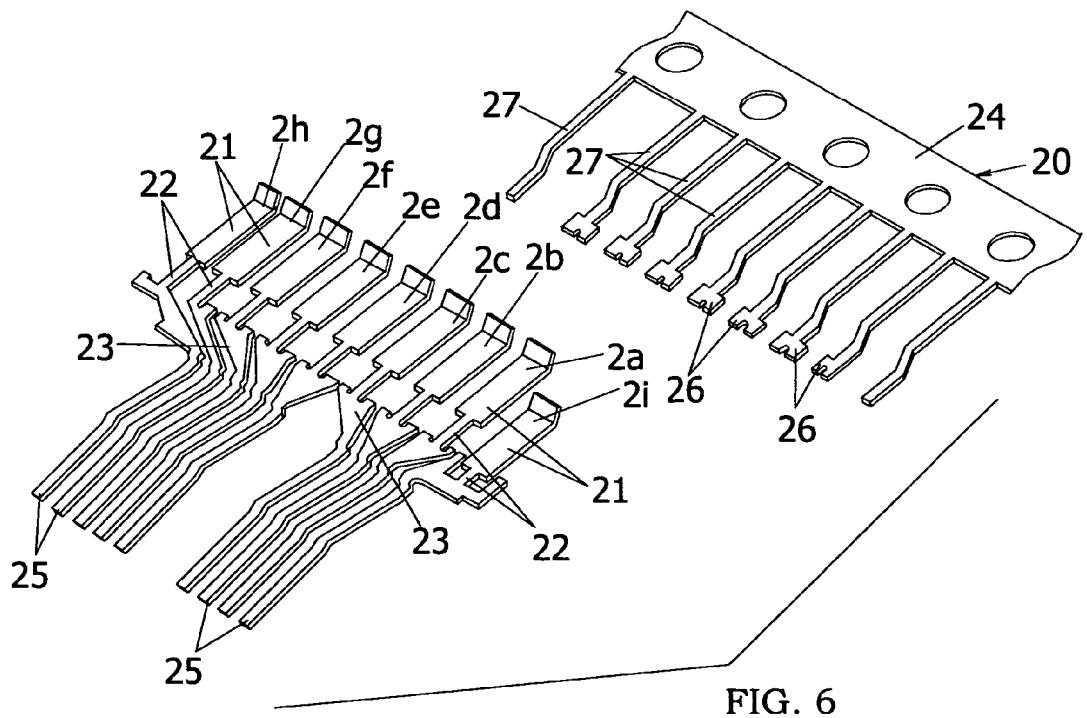
FIG. 6 is a perspective view of the electrically conductive members after being separated from the hoop material.

As shown in FIGS. 5 and 6, the conductive members are formed by punching and bending a hoop material 20 that is an electrically conducive metal such as phosphor bronze. In this case, since the conductive members are integrally formed by the hoop material, they can be easily mounted in the adaptor.

A plurality of coupling pieces 26 are used to couple between adjacent conductive members (2a to 2i). Each of the coupling pieces is coupled to a carrier portion 24 through a connecting bar 27. The conductive members 2h, 2i are coupled to the carrier portion 24 through the connecting bars 27 without the coupling pieces 26. The rearward end of each of the terminal elements 21 is bent in an upper oblique direction. Each of the connecting bars 27 is bent at a substantially same angle as the rearward end of the terminal element 21.

<Metal Shell>

The metal shell 3 is disposed on the base 1, so that the second terminal portions (contact spring elements 25) of the conductive members 2a to 2i are exposed in the memory-card storage room provided by the space surrounded by the metal shell 3 and the concave of the base.

As shown in FIGS. 7A to 7D, the metal shell 3 is integrally formed by punching and bending a thin metal sheet to comprise a rectangular top plate 31, stationary elements 32 each having L-shaped cross section and formed at a forward side of the top plate 31 to project from left and right side limbs, a pair of projecting pieces 33 projecting rearward from the rearward end of the top plate 31, and a pair of ground terminal elements 35 projecting from the rearward end of the top plate 31. In this embodiment, the ground terminal elements 35 contact the conductive members 2c, 2f. Rearward ends of the ground terminal elements 35 are bent in the upper oblique direction, as in the case of the terminal elements 21 of the conductive member 2c, 2f. In the drawings, the numeral 34 designates elastic spring elements projecting rearward from the respective stationary elements 32. Each of the elastic spring elements 34 has a bump 36 projecting toward the inside of the metal shell.

<Cover>

The cover 4 is made of an electrical insulating resin material, and joined with the base such that the first terminal portions (terminal elements 21) of the electrically conductive members 2a to 2i are held between the base 1 and the cover 4. In the present embodiment, as shown in FIGS. 8A to 8E, the cover 4 is configured in a substantially C-shape by a rectangular top plate 40, and a pair of arms 41 extending forward from both sides of the forward end of the top plate 40. The numeral 42 designates a concave formed in the arm 41 to accommodate the elastic spring element 34 of the metal shell 3. The numeral 43 designates a stopper wall extending horizontally in the concave 42 to prevent an upper displacement of the elastic spring element 34 relative to the cover 4. In addition, the numeral 44 designates the chamfer portion formed at a corner of the top plate 40 corresponding to the chamfer portion 14 of the base 1. The numeral 45 designates a notch formed at a portion of the cover 4 corresponding to the notch 15 of the base 1.

Figure 9:
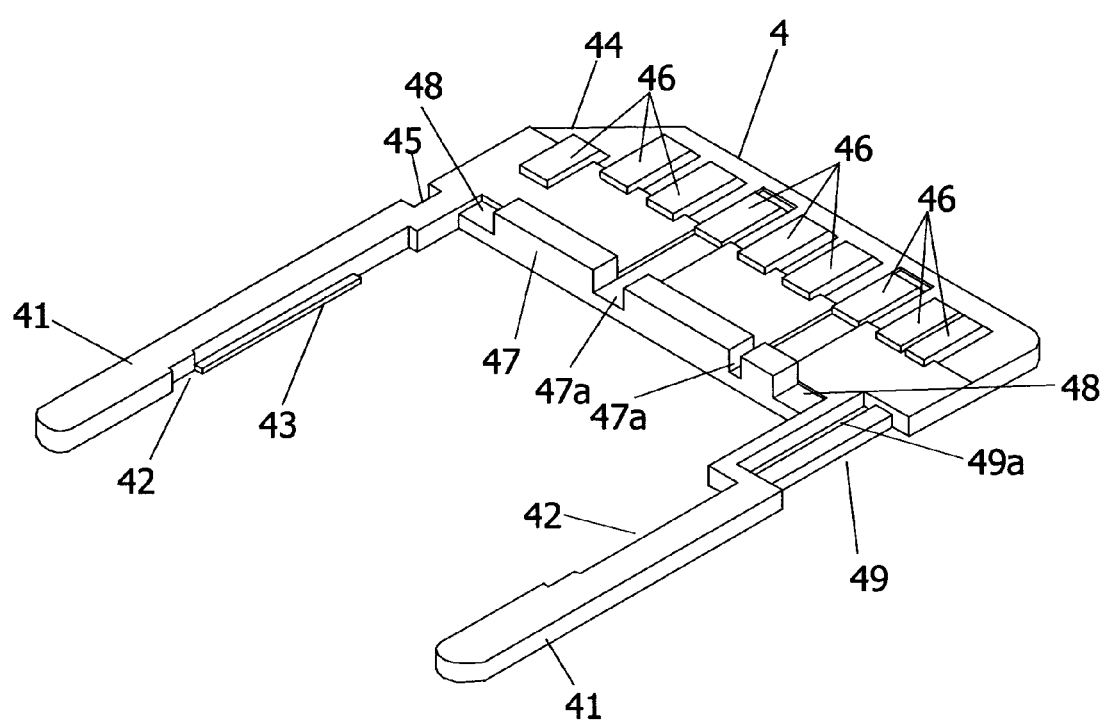
FIG. 9 is a perspective view of a cover.

As shown in FIG. 9, a terminal-element supporting stage 46 are formed on a bottom surface of the top plate 40 of the cover 4 to have the same arrangement as the terminals of the SD memory card. In the present embodiment, the number of the terminal-element supporting stages 46 is nine. The numeral 47 designates a stopper wall formed along the forward end of the top plate 40. This stopper wall 47 has grooves 47a formed at positions corresponding to the ground terminal elements 35 of the metal shell 3. Each of the grooves 47a extends to the corresponding terminal-element supporting stage 46. The numeral 48 designates trenches formed in both of left and right sides of the stopper wall 47, into which the projecting pieces 33 of the metal shell 3 are fitted. The numeral 49 designates a knob accommodating recess for accommodating the knob 7. The numeral 49a designates a groove extending in the back and forth directions of the cover 4 in the knob accommodating recess 49.

As shown in FIG. 3, the write-protect knob 7 is formed with an operating portion 70 of a rectangular solid shape, and an engaging piece 71 having a T-shaped cross section and projecting on a side of the operating portion. Claws 72 projecting upward and downward from the tip of the engaging piece 71 of the knob 7 are fitted in the grooves (12a, 49a) formed in the knob accommodating portions of the base 1 and the cover 2. By switching the position of the operating portion 70 exposed in the knob accommodating portion to travel between forward and rearward positions relative to the engaging boss 12b under a condition that the claws 72 are engaged to the grooves (12a, 49a), the write-protect status of the memory card is recognized by the electronic appliance with the adaptor inserted.

Figure 10:
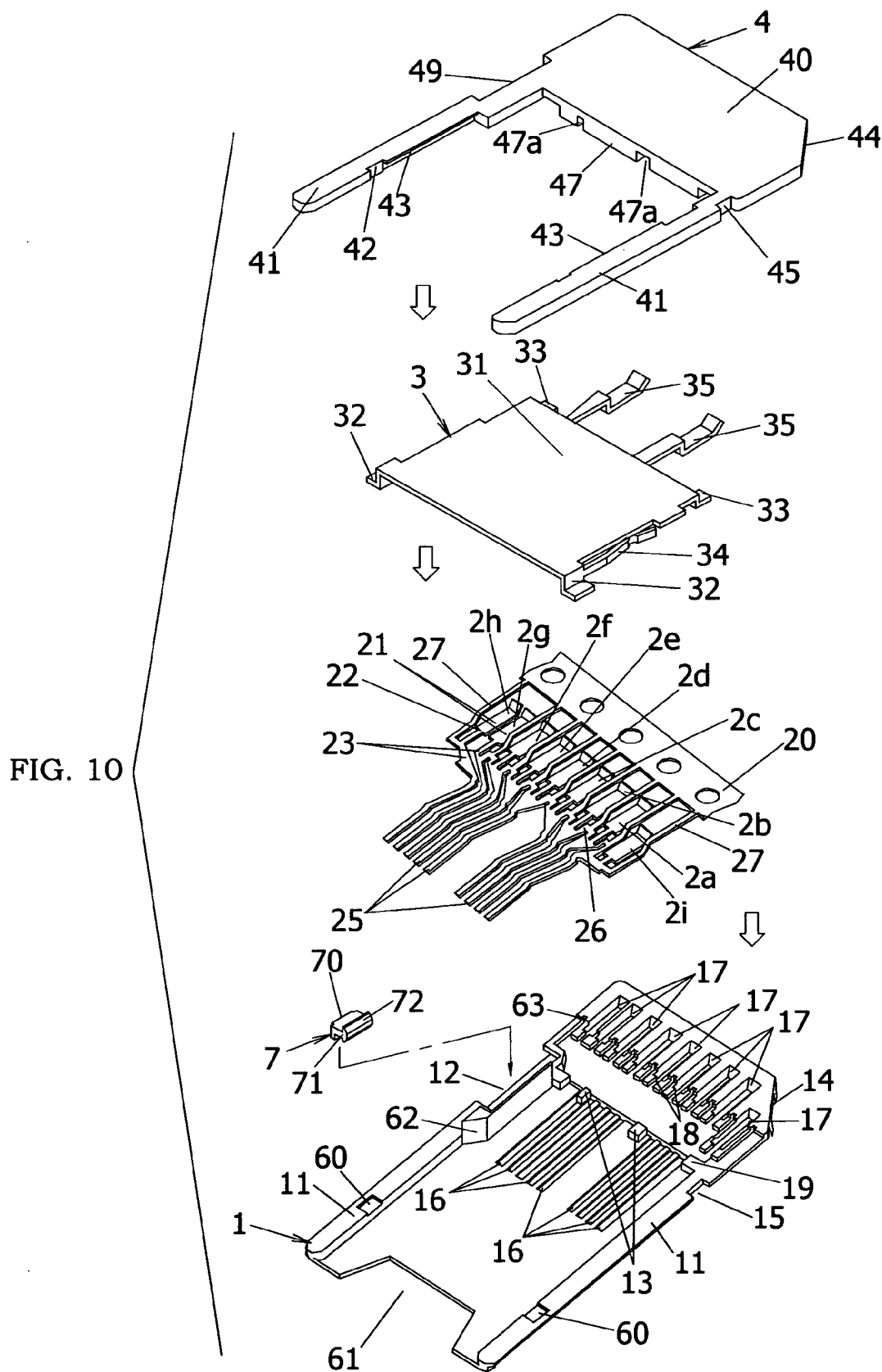
FIG. 10 is an exploded perspective view showing a manufacturing process of the adaptor.
Figure 12A:
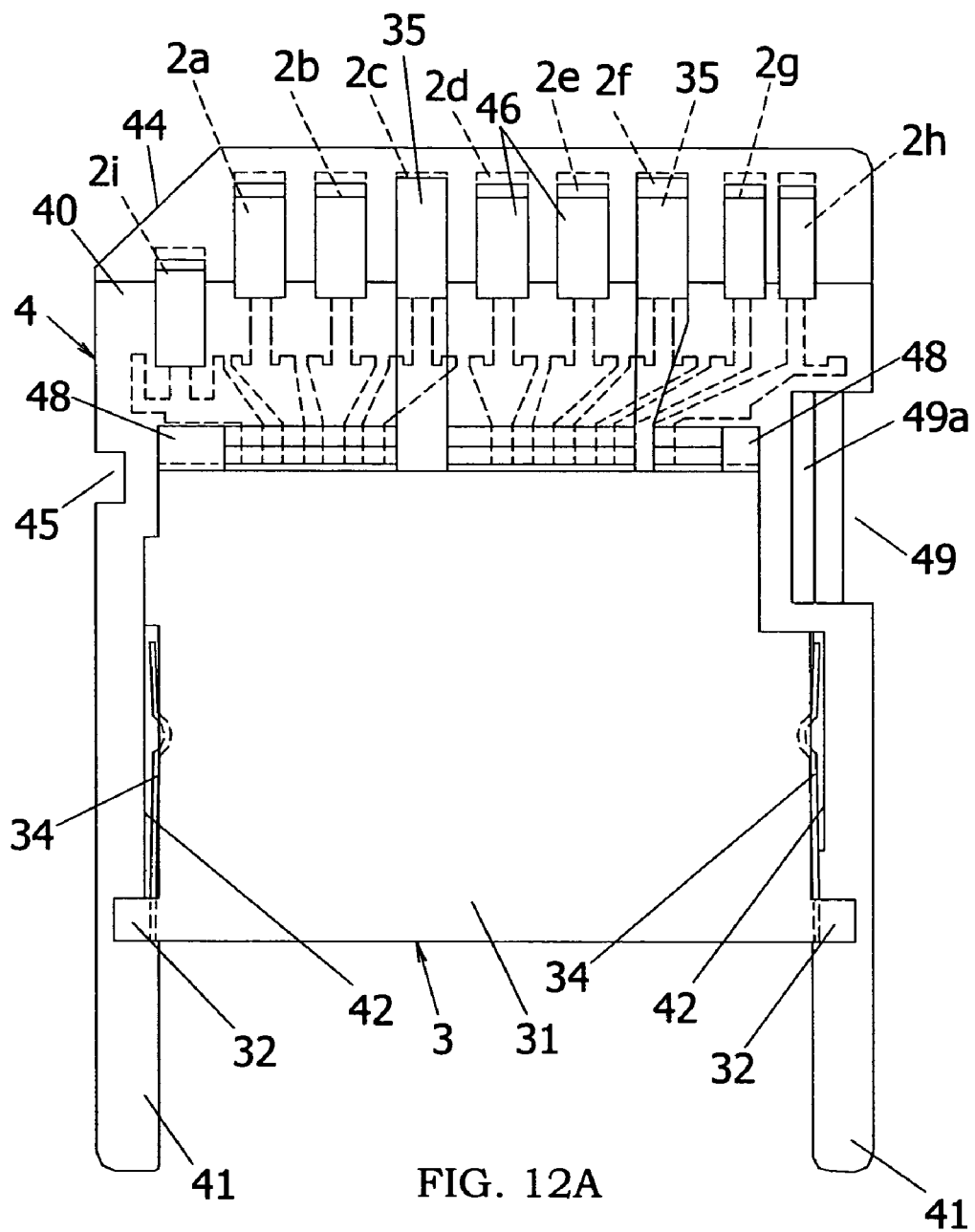
FIGS. 12A and 12B are plan and end views of the cover with the metal shell.
Figure 12B:
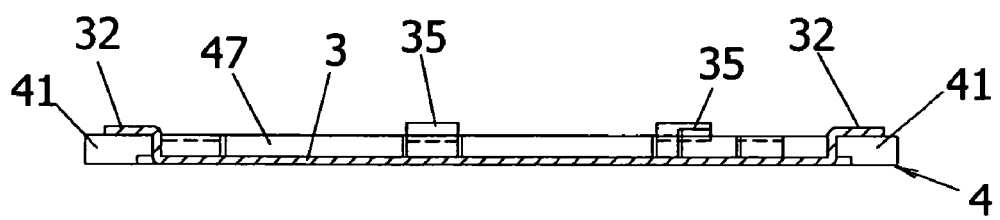

The adaptor of the present embodiment can be fabricated by using the above components, as described below. That is, as shown in FIG. 10, the electrically conductive members 2a to 2i integrally formed with the hoop material 20 are fixed to the base 1 such that the terminal elements 21 are inserted into the through holes 17, and the contact spring elements 25 are disposed in the channels 16. At this time, the stationary element 22 of each of the conductive members is pressed into the narrow slot 18 of the base 1, and the connecting bar 27 of each of the conductive members 2a to 2i is inserted into a slot 63 formed in the base 1.

By raising the carrier portion 24 up in this state, and bending the coupling bars 27 in the oblique upward direction relative to the center elements 23 of the conductive members 2a to 2i, portions connecting between the center elements 23 and the coupling bars 27 can be cut off (notch breaking). If necessary, the carrier portion 24 may be removed, while the conductive members 2a to 2i being held down by use of a jig. Consequently, the carrier portion 24 is separated from the conductive members 2a to 2i fixed to the base 1, so that the conductive members 2a to 2i are electrically insulated from each other by the base 1 of the insulating material.

Next, the knob 7 is installed in the knob accommodating recess 12 of the base 1, and the metal shell 3 is placed on the base 1. By jointing the cover 4 with the base 1, the fabrication is finished. The cover 4 can be appropriately jointed with the base 1 by means of ultrasonic welding, thermal bonding, adhesive joining, or caulking.

In the thus obtained adaptor A, as shown in FIGS. 11A, 11B, 12A and 12B, the terminal elements 21 of the conductive members 2a to 2i are allowed to abut against the terminal-element supporting stages 46 of the cover 4 directly or through the ground terminal elements 35 of the metal shell 3. The bent portions provided at the rear end of the terminal elements 21 are allowed to abut against inclined surfaces formed at the rearward end of the terminal-element supporting stages 46 or the ground terminal elements 35, and the terminal elements 21 are supported in the through holes 17 of the base 1.

The metal shell 3 is disposed such that the top plate 31 abuts against the stopper wall 47 of the cover 4. The stationary elements 32 of the metal shell 3 are held between the arms 41 of the cover 4 and the pockets 60 formed in the flanges 11 of the base 1. In addition, the projecting pieces 33 of the metal shell 3 are held between the trenches 48 of the cover 4 and the protrusions 19 of the base 1. The ground terminal elements 35 of the metal shell 3 are held between the grooves 47a of the cover 47 and the convexes 13 of the base 1.

In the present embodiment, an improvement in rigidity of the adaptor is achieved by fitting the metal shell 3 into an opening between the pair of arms 41 of the cover 4. In addition, since the metal shell 3 is provided by a separate part from the cover 4 and the base 1, the production cost can be reduced, as compared with the case of simultaneously molding the metal shell 3 with the resin cover 4. Consequently, a cost reduction for the adaptor can be achieved.

In the present embodiment, the ground terminal elements 35 of the metal shell 3 abut against the terminal elements 21 of the conductive members 2c, 2f for grounding (In the case of the SD memory card, they correspond to third and sixth pins). When the adaptor is inserted in the slot of the electronic appliance, those terminal elements 21 are connected to ground contacts of the electronic appliance. Therefore, the metal shell 3 is grounded to improve the shielding performance of the adaptor.

In the case of inserting the mini SD memory card "MSD" in the adaptor of this embodiment, the mini SD memory card is inserted in the card storage room through the insertion opening 5, as shown in FIG. 1. At this time, the mini SD memory card "MSD" is guided to the memory-card storage room by the arms 41 of the cover 4 and the flanges 11 of the base 1. In the memory-card storage room, the contact spring elements 25 are electrically connected to the I/O contact surfaces 53 of the mini SD memory card "MSD". In addition, the shoulder portion 51 of the mini SD memory card "MSD" abuts against the inclined wall 62 of the base 1 to prevent excessive insertion of the mini SD memory card into the adaptor. The mini SD memory card is locked in the adaptor by engaging the bumps 36 of the elastic spring elements 34 of the metal shell 3 to notches 55 of the mini SD memory card.

In the case of ejecting the mini SD memory card "MSD" from the adaptor A of the present embodiment, an end portion of the mini SD memory card exposed in the vicinity of the insertion opening 5 is grasped by the user's fingers, and the mini SD memory card is pulled out against the spring bias of the elastic spring elements 34 to release the engagements between the bumps 36 and the notches 55, and eject the mini SD memory card from the adaptor. Thus, when the elastic spring elements 34 are integrally formed with the metal shell 3, the total number of parts of the adaptor can be reduced, as compared with the case of separately providing the elastic spring elements 34 from the metal shell 3. Consequently, a further cost reduction for the adaptor can be achieved.

Second Embodiment

Figure 13:
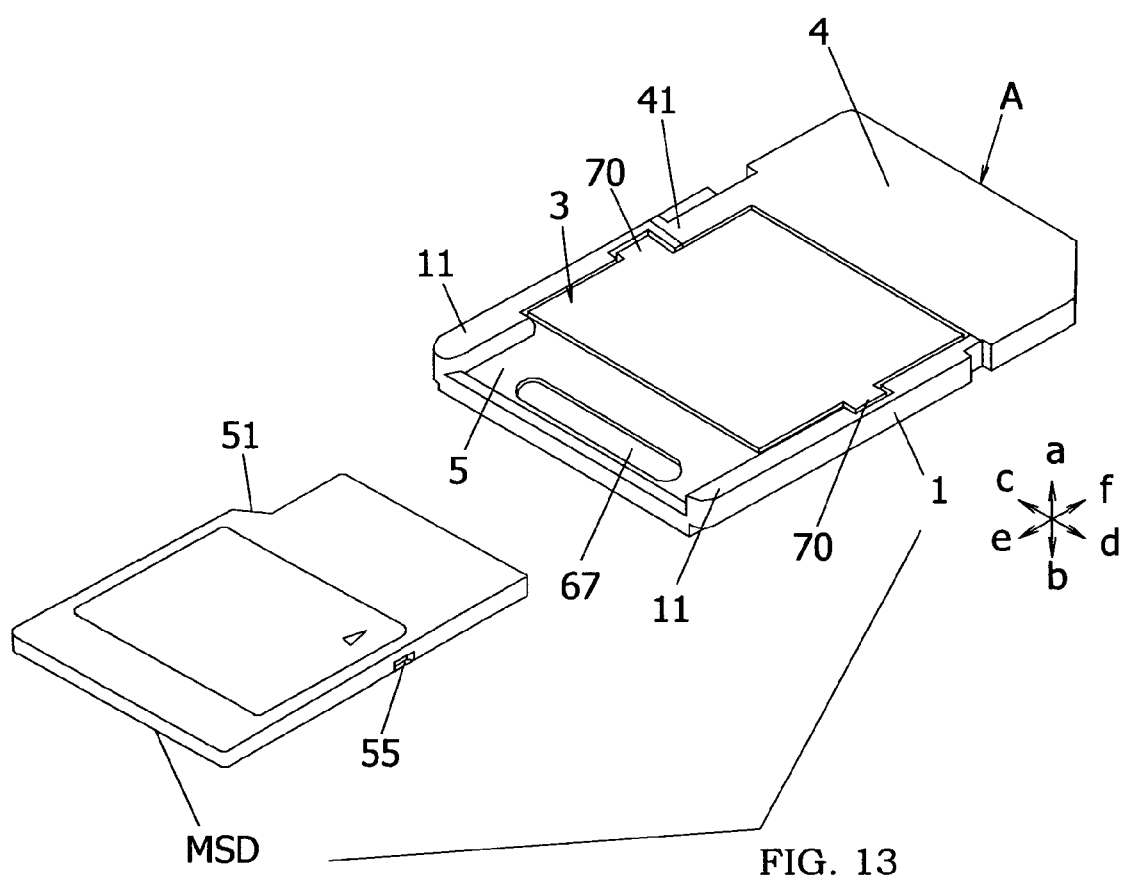
FIG. 13 is a perspective view of an adaptor for a memory card according to a second embodiment of the present invention.
Figure 14:
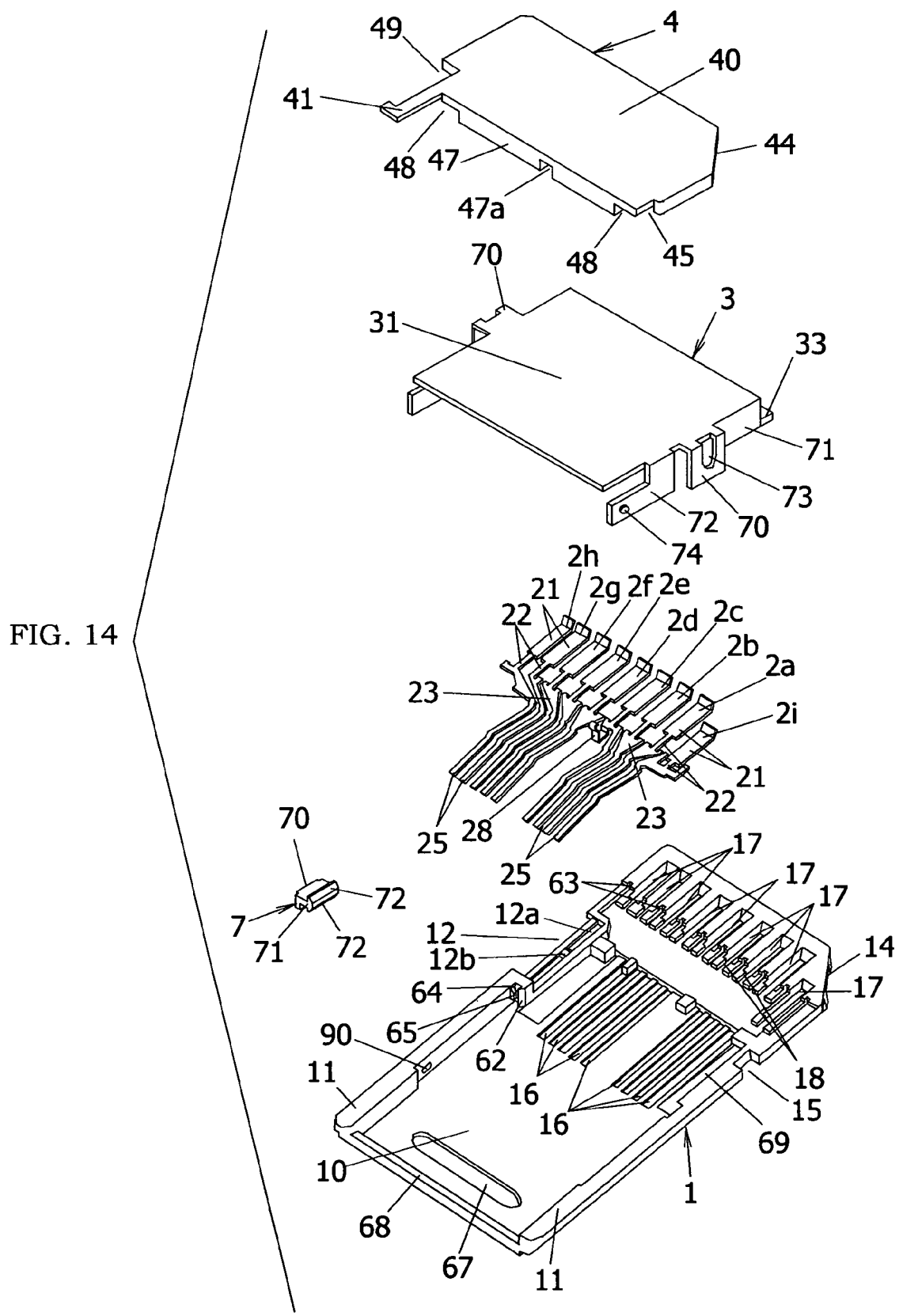
FIG. 14 is an exploded perspective view of the adaptor according to the second embodiment.

As shown in FIGS. 13 and 14, an adaptor A for a memory card according to a second embodiment of the present invention is mainly composed of a base 1 made of a synthetic resin, electrically conductive members 2a to 2i fixed to a top surface of the base, metal shell 3 supported to be movable relative to the base 1, and a cover 4 made of a synthetic resin. A memory-card storage room is provided by a space surrounded by the metal shell 3 and the base 1. As in the case of the first embodiment, this adaptor is used to make a connection with a slot for the regular-sized SD memory card of an electronic appliance, and has an insertion opening at one end, through which the mini SD memory card can be inserted in the adaptor. This adaptor is configured such that outside dimensions of the adaptor are substantially equal to the lengthwise, lateral and thickness dimensions of the regular-sized SD memory card. In the following explanation, unless otherwise specified, the directions shown by the arrows "a"–"b" in FIG. 13 designate up and down directions, the directions shown by the arrows "c"–"d" designate left and right directions, and the directions shown by the arrows "e"–"f" designate back and forth directions.

The base 1 of the present embodiment is substantially the same as that of the first embodiment except for the following features. Therefore, duplicate explanations are omitted. The base 1 is characterized by comprising a structure for movably supporting the metal shell 3. That is, a pair of flanges 11 are formed at both sides of the base 1 to extend in the back and forth directions, and a concave 64 is formed in each of the flanges 11. As shown in FIGS. 15A to 15D, a shaft portion 65 are integrally formed to project in each of the concaves 64 such that the metal shell 3 is pivotally movable about the shaft portion.

As shown in FIG. 15B, the shaft portion 65 has an inclined surface 66 extending from its top toward the flange 11. By using such a structure, it is possible to prevent that a deformation of the shaft portion 65 is caused by the pivotal movement of the metal shell 3 relative to the base.

The numeral 67 designates an operation opening of an oval shape, which is formed in the base 1 at the vicinity of the insertion opening 5. When ejecting the memory card from the adaptor, an end portion of the memory card can be pushed by the user's finger through the operation opening. The numeral 68 designates a rib projecting along the front edge of the base 1, which is useful to prevent accidental falling of the memory card from the adaptor. The numeral 69 designates a pair of grooves inclined rearward at about 2 to 3 degrees and located adjacent to the outermost channels 16 in the left and right directions. In this case, since the movable range of the metal shell 3 is increased, the ease of ejecting the memory card can be enhanced. The arrangement and the shape of through holes 17 formed in the base 1 are the same as the first embodiment.

Figure 18A:
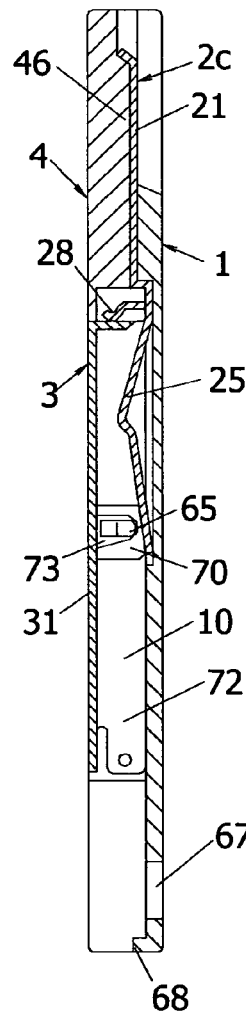
FIGS. 18A to 18C are cross-sectional views showing a seesaw motion of the metal shell.

The electrically conductive members 2a to 2i of this embodiment are substantially the same as that of the first embodiment except for the following features. Therefore, duplicate explanations are omitted. That is, since the metal shell 3 is movable in the present embodiment, it is characterized that the electrically conductive member 2c for grounding has an elastic piece 28, which elastically contacts the metal shell 3 under a condition of accommodating the mini memory card in the adaptor. The elastic piece 28 is configured in an L-shape to project on the base 1 upward and have an arcuate top end, as shown in FIG. 18A.

Figure 18B:
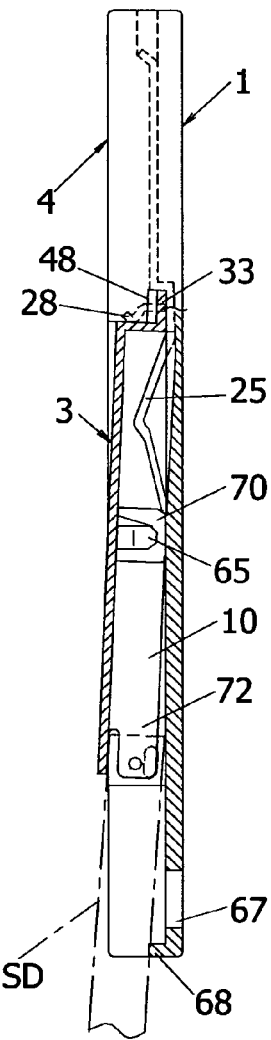
Figure 18C:
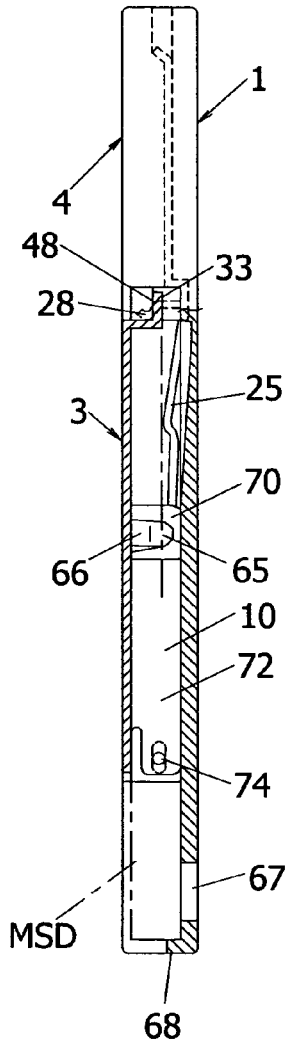

The metal shell 3 of the present embodiment is substantially the same as that of the first embodiment except for the following features. Therefore, duplicate explanations are omitted. That is, it is characterized in that the metal shell 3 of this embodiment is supported to be pivotally movable relative to the base 1 between an opening position where the memory card can be inserted in or ejected from the adaptor, as shown in FIG. 18B and a closing position where the ejection of memory card from the adaptor is prohibited, as shown in FIG. 18C.

Figures 16A, 16C:
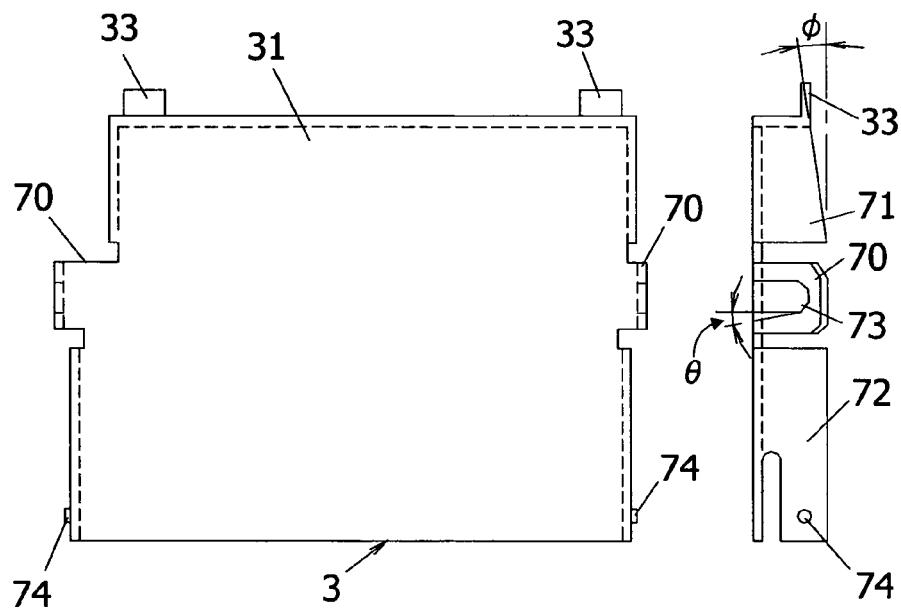
FIGS. 16A to 16C are respectively top, front and side views of the metal shell.
Figure 16B:
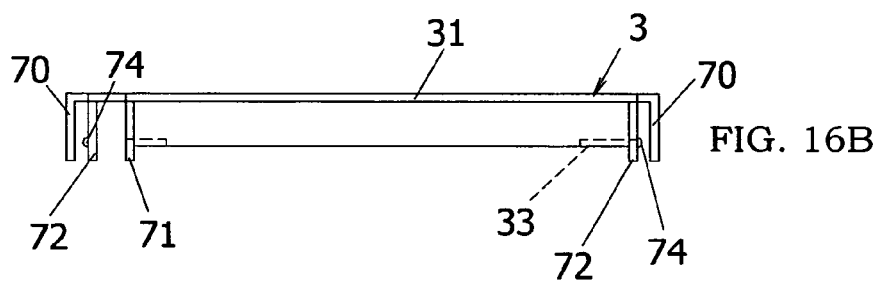

As shown in FIGS. 16A to 16C, the metal shell 3 is integrally formed by punching and bending a metal sheet, and composed of a rectangular top plate 31, bearing portions 70 hanging from substantially intermediate positions of both of right and left side limbs of the top plate 31, first wall 71 hanging from a rim of the top plate 31 and located at the rearward side of the bearing portion 70, second wall 72 hanging from a rim of the top plate and located at the forward side of the bearing portion 70, and projecting pieces 33 projecting rearward from opposite sides of the rear end of the top plate 31.

Each of the bearing portions 70 has a U-shaped bearing hole 73, in which the shaft portion 65 of the base 1 can be inserted. In addition, as shown in FIG. 16C, an angle "θ" between a front side facing the bearing hole 73 and a normal line perpendicular to the top plate 31 is set in a range of 2 to 3 degrees. Moreover, an angle "φ" between a bottom of the first wall 71 and a horizontal line parallel to the top plate 31 is set in a range of 2 to 3 degrees. In the drawings, the numeral 74 designates a boss projecting outward at the vicinity of a front end of the second wall 72.

The cover 4 of the present embodiment is substantially the same as that of the first embodiment except for the following features. Therefore, duplicate explanations are omitted. That is, the cover 4 is made of an electrical insulating resin material, and mainly composed of a top plate 40, and a single arm 41 projecting forward from one side of a forward end of the top plate. The arrangement and the shape of the terminal-element supporting stages and the stopper wall formed on a bottom surface of the cover 4 are substantially the same as the first embodiment.

The structure and the operation of the knob 7 for switching between a writable status and a write-protect status of data in the memory card are the same as the first embodiment. Therefore, duplicate explanations are omitted.

The adaptor of the present embodiment can be fabricated by using the above components, as described below. First, the conductive members 2a to 2i are fixed to the base 1, as in the case of the first embodiment. That is, the terminal elements 21 of the conductive members are disposed in the through holes 17, and the contact spring elements 25 are fitted in the channels 16.

Next, the metal shell 3 is attached to the base 1. When the metal shell 3 is pressed against the base 1 to fit the bearing portions 70 of the metal shell 3 in the concaves 64 of the base 1, the bearing portions 70 are guided by the inclined surfaces 66 of the shaft portions 65, and elastically deformed, so that the shaft portions 65 are inserted in the bearing holes 73. Consequently, the metal shell 3 is supported to be pivotally movable about the shaft portions 65 of the base 1. At this time, the bosses 74 projecting on the second walls 72 of the metal shell 3 are engaged into recesses 90 formed in inner side surfaces of the flanges 11 of the base 1.

Next, the knob 7 is installed in the knob accommodating recess 12 of the base 1, and the cover 4 is placed on the base 1 such that the terminal elements 21 of the conductive members 2a to 2i are held between the cover 4 and the base 1. By jointing the cover 4 with the base 1, the fabrication is finished. The cover 4 can be appropriately jointed with the base 1 by means of ultrasonic welding, thermal bonding, adhesive joining, or caulking.

In the thus obtained adaptor, since the shaft portions 65 of the base 1 are fitted in the bearing holes 73 of the bearing portions 70, the front side facing the bearing hole 73 is inclined at the angle "θ" (2 to 3 degrees), and the bottom of the first wall 71 is inclined relative to the horizontal line at the angle "φ" (2 to 3 degrees), as described above, the metal shell 3 is supported to be pivotally movable about the shaft portions 65 between the opening position where the top plate 31 is inclined relative to the base 1 at 2 to 3 degrees and the closing position where the top plate 31 is substantially parallel to the base 1.

When the metal shell 3 is in the closing position, the projecting pieces 33 abut against the top plate 40 in the trenches 48 formed in the cover 4. Therefore, it is possible to prevent excessive pivotal movement of the metal shell 3 beyond the closing position. In addition, since the elastic piece 28 of the conductive member 2c for grounding abuts against the metal shell 3, and the terminal element 21 of the conductive member 2c is connected to the ground contact of the electronic appliance under a condition of inserting the adaptor in the memory card slot of the electronic appliance, the metal shell 3 is grounded to improve the shielding performance of the adaptor.

Figures 17A, 17B:
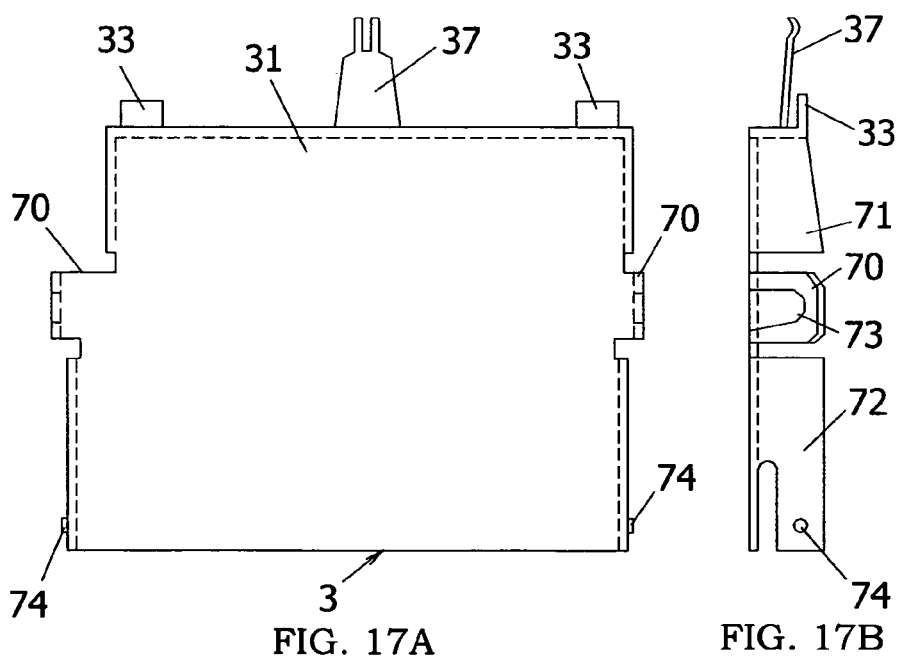
FIGS. 17A and 17B are top and side views of a modification of the metal shell.

As a modification of the present embodiment, as shown in FIGS. 17A and 17B, an elastic piece 37 may be formed on the metal shell 3 in place of forming the elastic piece 28 on the conductive member 2c. In this case, it is possible to prevent floating of the metal shell 3 at the side of the insertion opening 5 when the mini SD memory card "MSD" is not inserted in the adaptor.

In the case of trying to insert the mini SD memory card "MSD" in the adaptor of the present embodiment, when the metal shell 3 is positioned, as shown in FIG. 18A, the mini SD memory card can not be inserted in the adaptor because an opening dimension of the insertion opening 5 becomes smaller than the thickness of the mini SD memory card by the presence of the rib 68 on the base 1. Therefore, the metal shell 3 is pivotally moved to the opening position shown in FIG. 18B to increase the opening dimension of the insertion opening 5. In this state that the metal shell 3 is kept in the opening position, the mini SD memory card can be inserted in the memory-card storage room provided between the base 1 and the metal shell 3 through the insertion opening 5.

At this time, the contact spring elements 25 disposed parallel to each other in the memory-card storage space are electrically connected to the I/O contact surfaces 53 formed on the mini SE memory card "MSD". In addition, since the shoulder portion 51 of the mini SD memory card abuts against the inclined wall 62 of the base 1, it is possible to prevent excessive insertion of the mini SD memory card into the adaptor.

In addition, since the grooves 69 are formed in the base 1, the metal shell 3 can be moved in a seesaw fashion over a wider range to improve the operationality of inserting the mini SD memory card. After the mini SD memory card is inserted to reach a predetermined position in the adaptor, the metal shell 3 is pivotally moved from the opening position to the closing position, as shown in FIG. 18C. In this case, it is possible to stably accommodate the mini SD memory card in the memory-card storage room, and prevent accidental falling of the mini SD memory card from the adaptor by the rib 68.

In the closing position, as shown in FIG. 18C, the bosses 74 formed on the second walls 72 of the metal shell 3 are engaged into the recesses 90 of the base 1, so that the metal shell 3 is locked in the base 1. Therefore, it is possible to prevent unwanted pivotal movement of the metal shell 3 from the closing position toward the opening position.

In the present embodiment, since a fulcrum (shaft portion 65) of the pivotal movement of the metal shell 3 is positioned between the insertion opening 5 and a substantially intermediate portion (top portion) of the contact spring elements 25 of the conductive members 2*a* to 2*i*, a contact pressure that the I/O contact surfaces 53 of the mini SD memory card receive from the conductive members 2*a* to 2*i* effectively contributes to prevent the unwanted pivotal movement of the metal shell 3 from the closing position to the opening position.

Figure 19:
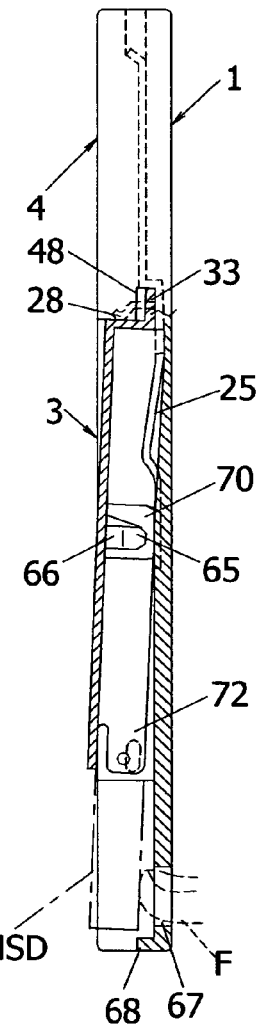
FIG. 19 is a cross-sectional view showing a motion of ejecting the memory card from the adaptor.

In the case of trying to eject the mini SD memory card "MSD" from the adaptor of the present embodiment, the mini SD memory card is pushed upward by, for example, the user's finger F inserted in the memory-card storage room through the operation opening 67, as shown in FIG. 19. Thereby, the engagements between the bosses 74 and the recesses 90 are released, and the metal shell 3 is pivotally moved together with the mini SD memory card from the closing position toward the opening position. In the opening position, the mini SD memory card can be easily ejected from the adaptor without being interrupted by the rib 68. In place of the operation opening 67, an operation recess or notch may be formed in the front-end portion of the base, as shown in the first embodiment (for example, "61" in FIG. 4A). The operation recess or notch can be configured in such a dimension that the user's finger can be inserted in the adaptor therethrough in the case of inserting or ejecting the mini SD memory card "MSD".

INDUSTRIAL APPLICABILITY

As described above, according to the adaptor of the present invention, a mini-sized memory card can be used in an electronic appliance having a slot for a regular-sized memory card such as digital cameras, laptop computers and mobile phones. In addition, since the rigidity of the adaptor is improved by the metal shell, it is effective to prevent the occurrence of damage to the memory card. Moreover, when the adaptor is not connected to the electronic appliance, the thin mini-sized memory card can be safely protected by the adaptor to improve the ease-of-use of the memory card. Furthermore, when the metal shell is pivotally movable between the opening position and the closing position, it is possible to prevent accidental falling of the memory card from the adaptor connected to the slot of the electronic appliance. In the case of connecting the metal shell to the ground contact of the electronic appliance through the electrically conductive member for grounding, the shielding performance of the adaptor can be improved.

Thus, in the rapid advance of electronic appliances, it is possible to provide a reliable compatibility between the mini-sized memory card and the electronic appliances having the slot for a different-sized memory card.

The invention claimed is:

1. An adaptor for a memory card having an insertion opening at its one end, through which said memory card is housed in the adaptor, and configured to be connectable to a memory card slot of an electronic appliance, the adaptor comprising:
    a base made of a resin material;
    a plurality of electrically conductive members fixed to a surface of said base so as to electrically contact a plurality of terminals of said memory card inserted in the adapter;
    a cover made of a resin material; and
    a metal shell held between said base and said cover, so that a memory-card storage room is provided by a space surrounded by said metal shell and the surface of said base,
    wherein said metal shell is supported by said base to be movable in a seesaw fashion between an opening position where an insertion of said memory card in said memory-card storage room is enabled and a closing position where an ejection of said memory card from said memory-card storage room is disabled.

2. The adaptor as set froth in claim 1, wherein said base has a projection formed at the vicinity of said insertion opening to prevent falling of said memory card from the adaptor.

3. The adaptor as set froth in claim 1, wherein the seesaw motion of said metal shell is provided by engagements between a pair of pivot shafts formed on said metal shell and bearing portions formed in said base.

4. The adaptor as set froth in claim 1, wherein said base has a groove in a surface facing said memory-card storage room to increase a range of the seesaw motion of said metal shell.

5. The adaptor as set froth in claim 1, wherein a projection is integrally formed with said metal shell, and said metal shell is locked at the closing position by engaging said projection to a concave formed in said base.

6. The adaptor as set froth in claim 1, wherein said cover has a stopper for prohibiting an excessive seesaw motion of said metal shell.

7. The adaptor as set froth in claim 1, wherein said electrically conductive members comprise an electrically conductive member for grounding, one of said metal shell and said electrically conductive member for grounding has an elastic piece, and said electrically conductive member for grounding contacts said metal shell at the closing position through said elastic piece.

8. The adaptor as set froth in claim 1, wherein said base has a notch configured such that said memory card is pushed from the outside of the adaptor through said notch in a direction of facilitating an ejection of said memory card from said memory-card storage room.

* * * * *